(No Model.)
W. F. CAMP.
ATTACHMENT FOR PLOWS.
No. 459,743. Patented Sept. 22, 1891.
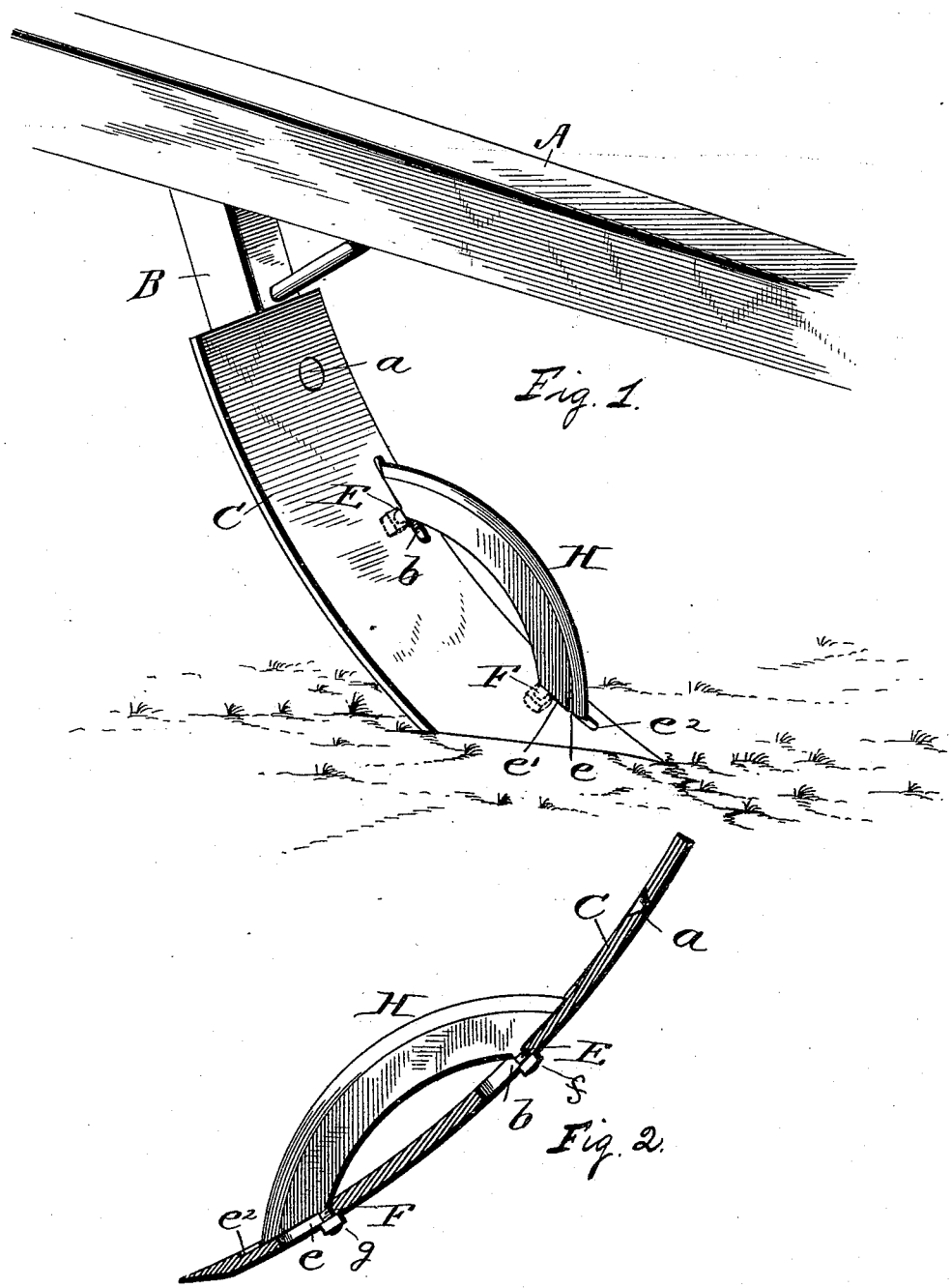

UNITED STATES PATENT OFFICE.

WESLEY F. CAMP, OF NANNIE, GEORGIA.

ATTACHMENT FOR PLOWS.

SPECIFICATION forming part of Letters Patent No. 459,743, dated September 22, 1891.

Application filed June 8, 1891. Serial No. 395,530. (No model.)

*To all whom it may concern:*

Be it known that I, WESLEY F. CAMP, a citizen of the United States, residing at Nannie, in the county of Floyd and State of Georgia, have invented certain new and useful Improvements in Attachments for Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to plows, and chiefly to an attachment for splitting the ground in front of the plow, severing roots, and cutting turf and clods.

The object of the invention is to lighten the draft and provide a simple cutter which can be quickly attached to or removed from a plow, and which will be efficient for the purpose designed.

The improvement consists of the novel features which will be hereinafter more fully described and claimed, and which are shown in the annexed drawings, in which—

Figure 1 is a perspective view of a plow embodying my invention. Fig. 2 is a longitudinal section of the plow, taken on a line to show the openings through which the several fastenings pass that secure the cutter to the plow and the plow to the stock, showing the cutter in full.

The plow-beam A, stock B, and plow C are of ordinary construction and relative arrangement. The plow is provided with three openings $a$, $b$, and $e$, the opening $a$ being at the heel of the plow and designed to receive the fastening which secures the plow to the stock. The openings $b$ and $e$ are oblong and extend in the direction of the length of the plow, and are adapted to receive the fastenings E and F, respectively, of the cutter H. The fastening E is threaded and projects beyond the under side of the plow and receives the nut $g$ on the projecting end. The fastening F is oblong and is provided with a head $f$ at its forward corner. The opening $e$ is enlarged at $e'$ to receive the head $f$ when removing or placing the cutter H in position on the plow. The groove $e^2$ in the plow, in advance of and in line with the opening $e$, forms a seat for the front end of the cutter, which enters therein and is braced thereby against lateral strain. The cutter H is curved in the direction of length from end to end, and when in position stands at right angles to the plow. The upper edge of the cutter is sharpened. To prevent the lodgment of dirt and roots in the angles between the sides of the cutter and plow, the lower portion of the cutter is cut away, thereby leaving a space between the lower edge of the said cutter and the top side of the plow.

In assembling the parts the fastenings E and F are thrust through the opening $b$ and $e$ and the cutter H is pressed rearward to cause the head $f$ to overlap the sides of the opening $e$, and the nut $g$, which was previously removed, is screwed on the threaded fastening E and secures the cutter on the plow. It will be observed that the fastening F is about equal in length to the thickness of the plow and comes flush with the under side of the plow when the cutter is in place. The sides of the head are beveled, and the opening $e$ is correspondingly countersunk to receive the said head.

Having thus described my invention, what I claim to be new, and desire to secure by Letters Patent, is—

1. The combination, with the plow having oblong openings $b$ and $e$, extending in the direction of the length of the plow, near one edge thereof, of the arc-shaped cutter arranged vertically at right angles to the plow and provided with fastenings E and F, one near each end, said fastenings being fitted in said openings, the fastening E being threaded and projected beyond the under side of the plow and receiving a nut on the projecting end, and the fastening F being oblong and provided with a head at its forward corner, the opening $e$ being enlarged, as at $e'$, and the plow formed with a groove $e^2$ upon its upper face, near its point, substantially as and for the purpose specified.

2. The combination, with the plow having openings $b$ and $e$ and having the groove $e^2$, the opening $e$ being enlarged and countersunk, of the cutter having the fastenings E and F, the fastening F being oblong and having the beveled head $f$, substantially as described, and for the purpose specified.

In testimony whereof I affix my signature in presence of two witnesses.

WESLEY F. CAMP.

Witnesses:
S. MEYERHARDT,
JOHN P. DAVIS.